United States Patent Office 2,879,541
Patented Mar. 31, 1959

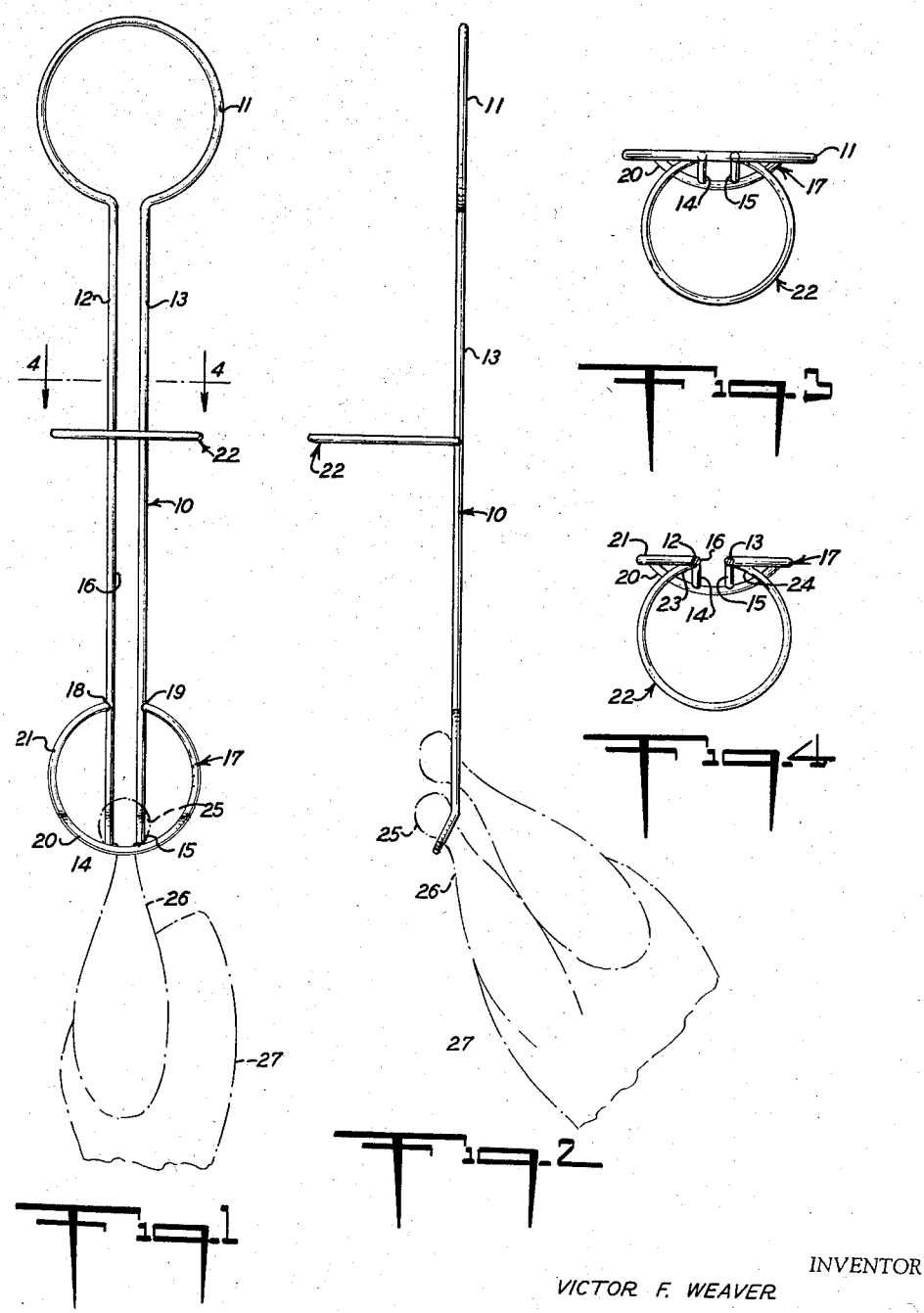

2,879,541
POULTRY SUSPENSION SHACKLE
Victor F. Weaver, New Holland, Pa.

Application October 9, 1956, Serial No. 614,962

3 Claims. (Cl. 17—44.1)

This invention relates to the processing or handling of food products and more particularly to an apparatus for facilitating the handling, cooling or other treatment of food products, such as, dressed poultry in preparing the same for market.

Heretofore, it has been customary to provide apparatus known as shackles for holding poultry during dressing operations, but in general, these prior art shackles have been designed to hold a single bird during operations thereon and also it has been customary to cool dressed poultry merely by placing the birds in a vat or other container of water for a sufficient time to accomplish the desired cooling.

It has been found that dressed poultry may be more efficiently cooled by suspending a plurality of birds from a single shackle and by conveying such suspended birds through a bath of ice water at a sufficient rate of movement to accomplish the desired cooling during the travel through such bath. Since the prior art shackles are primarily intended to hold only a single bird, their use for suspending a plurality of birds and conveying the same through a cooling bath is not particularly desirable and consequently a shackle which may be conveniently and economically manufactured and utilized for this purpose represents a significant step forward in the art.

It is accordingly an object of the invention to provide a poultry suspension shackle which may be conveniently and economically manufactured from readily available materials and which will serve to support a plurality of dressed birds for passage through a cooling bath or for other purposes.

A further object of the invention is the provision of a poultry suspension shackle to which the poultry may be conveniently and rapidly attached merely by inserting the legs thereof in a slideway and in which the poultry is maintained in place merely by frictional engagement and without requiring any operation other than engaging the poultry legs in the slideway.

A still further object of the invention is the provision of a poultry suspension shackle having a minimum number of parts and providing for convenient and rapid attachment of the poultry thereto, such shackle being of a structure which permits convenient sterilization thereby maintaining the same in a sanitary condition at all times.

Further objects and advantages of the invention will be apparent from the following description taken in conjunction with the accompanying drawing, wherein:

Figure 1 is a front elevational view of a poultry suspension shackle constructed in accordance with this invention and showing in dotted lines the position of poultry suspended therefrom;

Figure 2 is a side elevational view of the shackle shown in Figure 1 together with the position of the poultry shown in dotted outline;

Figure 3 is a top plan view of the shackle of this invention; and

Figure 4 is a sectional view on the line 4—4 of Figure 1.

With continued reference to the drawing, there is shown therein a poultry suspension shackle constructed in accordance with this invention and which may well comprise a generally U-shaped elongated body 10 having an enlarged loop 11 at one end and with spaced parallel legs 12 and 13 extending from the ends of the loop 11. The loop 11 as well as legs 12 and 13 may be formed from a single piece of material, such as, a stainless steel bar, although, of course, other suitable materials may be employed, but it is to be noted that the material utilized should be capable of withstanding temperatures or chemical treatment necessary for sterilization in order to maintain the device of this invention in a sanitary condition.

The legs 12 and 13 of the body 10 terminate at their lower ends in off-set portions 14 and 15 disposed at an angle to the plane of the legs 12 and 13 and it is to be noted that such legs together with the off-set portions 14 and 15 provide an elongated slideway 16, the purpose of which will be presently described.

The slideway 16 is closed at the ends of the off-set portions 14 and 15 by an open-ended ring 17 which, as clearly shown in Figure 1, is secured at substantially the midpoint thereof to the ends of the off-set portions 14 and 15 and the end 18 of the ring 17 is secured to the leg 12 while the end 19 of the ring 17 is secured to the leg 13 at a point somewhat above the off-set portions 14 and 15. It is further to be noted that the lower portion 20 of the ring 17 is off-set to lie in the plane of the off-set portions 14 and 15 of the body 10, while the portion 21 of the ring 17 lies in the same plane as the legs 12 and 13 of the body 10. It will thus be seen that the ring 17 serves to close the lower end of the slideway 16 and that the attachment of the ends 18 and 19 of the ring 17 to the legs 12 and 13 will serve to resist spreading of such legs with a consequent increase in width of the slideway 16.

In order to prevent spreading of the legs 12 and 13 and a consequent increase in width of the slideway 16 substantially midway the length thereof, there may be provided a bridging member 22 in the form of an open-ended ring and one end 23 of the ring 22 may be secured to the leg 12 of the body 10 while the other end 24 of the ring 22 is secured to the leg 13. As will be seen from an inspection of Figures 1 and 2, the bridging member 22 is disposed at substantially right angles to the legs 12 and 13 on the same side of the body 10 as the off-set portions 14 and 15.

In utilizing the poultry suspension shackle of this invention, it is only necessary to pass the leg joints 25 of the legs 26 of dressed poultry 27 through the loop 11 and engage the legs 26 in the slideway 16 with the leg joints 25 disposed on one side of the legs 12 and 13 of the body 10 and with the major portion of the dressed poultry 27 disposed on the opposite side of the legs 12 and 13 of the body 10, as clearly shown in Figure 2 of the drawing. As shown in this Figure 2, the poultry 27 will move downwardly in the slideway 16 until the legs 26 thereof engage the lower portion 20 of the ring 17 closing the slideway 16 and other poultry may be secured to the shackle in the same manner until a sufficient number of birds have been attached thereto, whereupon the shackle may be suspended by the ring 11 from a suitable conveyor for further processing of the poultry, such as passage through a cooling tank.

The poultry suspension shackle of this invention comprises only three parts, as fully described above, and, obviously, there is provided thereby an extremely economical structure which will efficiently serve the purpose for which it is intended and which may be conveniently maintained in a sterilized condition.

It will be obvious to those skilled in the art that various changes may be made in the invention without departing from the spirit and scope thereof and, therefore, the invention is not limited by that which is shown in the drawing and described in the specification, but only as indicated in the appended claims.

What is claimed is:

1. A poultry suspension shackle comprising an elongated loop member, said loop member being enlarged adjacent one end to permit insertion of the poultry legs, said loop member having a spreading resistance means adjacent the end opposite to said enlarged end, said means comprising a portion forming said end of said loop and extensions connected to said loop at points spaced from said end.

2. A poultry suspension shackle as defined in claim 1 in which the end of said loop member opposite to said enlarged end and a portion of said extensions are offset and disposed at an angle to the plane of said loop member.

3. A poultry suspension shackle as defined in claim 2 including a bridging member comprising an open ended ring having the ends thereof secured to the sides of said loop member substantially midway of the length thereof to resist spreading of the sides of said loop member and with said bridging member disposed at substantially right angles to the plane of said loop member on the same side as said offset.

References Cited in the file of this patent

UNITED STATES PATENTS

| | | |
|---|---|---|
| 583,476 | Huber | June 1, 1897 |
| 938,765 | Henig | Nov. 2, 1909 |